(12) United States Patent
Murakata

(10) Patent No.: US 8,422,088 B2
(45) Date of Patent: Apr. 16, 2013

(54) IMAGE PROCESSING DEVICE, IMAGE FORMING DEVICE, IMAGE PROCESSING METHOD, IMAGE PROCESSING PROGRAM, AND RECORDING MEDIUM

(75) Inventor: Akira Murakata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 389 days.

(21) Appl. No.: 12/669,962

(22) PCT Filed: Sep. 9, 2008

(86) PCT No.: PCT/JP2008/066623
§ 371 (c)(1),
(2), (4) Date: Jan. 21, 2010

(87) PCT Pub. No.: WO2009/035122
PCT Pub. Date: Mar. 19, 2009

(65) Prior Publication Data
US 2010/0182655 A1    Jul. 22, 2010

(30) Foreign Application Priority Data
Sep. 13, 2007    (JP) .................................. 2007-238242

(51) Int. Cl.
*H04N 1/04* (2006.01)
(52) U.S. Cl.
USPC ........... 358/474; 358/408; 358/442; 358/1.15
(58) Field of Classification Search ................. 358/474, 358/408, 442, 1.15, 1.13, 1.14
See application file for complete search history.

(56) References Cited

U.S. PATENT DOCUMENTS

| 5,390,003 | A | 2/1995 | Yamaguchi et al. |
| 7,391,693 | B2 * | 6/2008 | Hashimoto ................ 369/53.31 |
| 7,702,657 | B2 * | 4/2010 | Sato et al. .................... 707/802 |
| 8,174,715 | B2 * | 5/2012 | Kato et al. .................. 358/1.15 |
| 2005/0185972 | A1 * | 8/2005 | Yamamura .................... 399/24 |
| 2006/0012820 | A1 * | 1/2006 | Miyamoto .................. 358/1.14 |
| 2006/0061811 | A1 | 3/2006 | Murakata |
| 2008/0056598 | A1 | 3/2008 | Murakata |

FOREIGN PATENT DOCUMENTS

| JP | 1 125627 | 5/1989 |
| JP | 2005 045673 | 2/2005 |
| JP | 2005 277841 | 10/2005 |

OTHER PUBLICATIONS

Extended European Search Report issued Dec. 5, 2011, in Patent Application No. 08830591.7.

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An image processing device includes a storage unit which stores both image data input from a reading unit and relevant information of the image data, a first image-data-processing unit which processes both the image data input from the reading unit and image data output to a writing unit, and a second image-data-processing unit which is detachably attached to the first image-data-processing unit, has an image recognition function, and processes the image data input from the reading unit. The first image-data-processing unit includes a recognition unit recognizing the input image data, an image processing unit performing image processing based on a result of the recognition by the recognition unit, and a determining unit determining whether operation of the second image-data-processing unit is normal.

17 Claims, 18 Drawing Sheets

FIG.3

WITHOUT OPTION BOARD:

| APPLICATION | SINGLE-SIDE | DOUBLE-SIDE |
|---|---|---|
| COPY | (1) (3) | (1) (2) (3) |
| SCANNER | (1) | (1) (2) |
| FAX | (1) | (1) (2) |
| PRINTER | (3) | (3) |

WITH OPTION BOARD:

| APPLICATION | SINGLE-SIDE | DOUBLE-SIDE |
|---|---|---|
| COPY | (1) (3) (4) | (1) (2) (3) (4) (5) |
| SCANNER | (1) (4) | (1) (2) (4) (5) |
| FAX | (1) (4) | (1) (2) (4) (5) |
| PRINTER | (3) (4) | (3) |

FIG.5
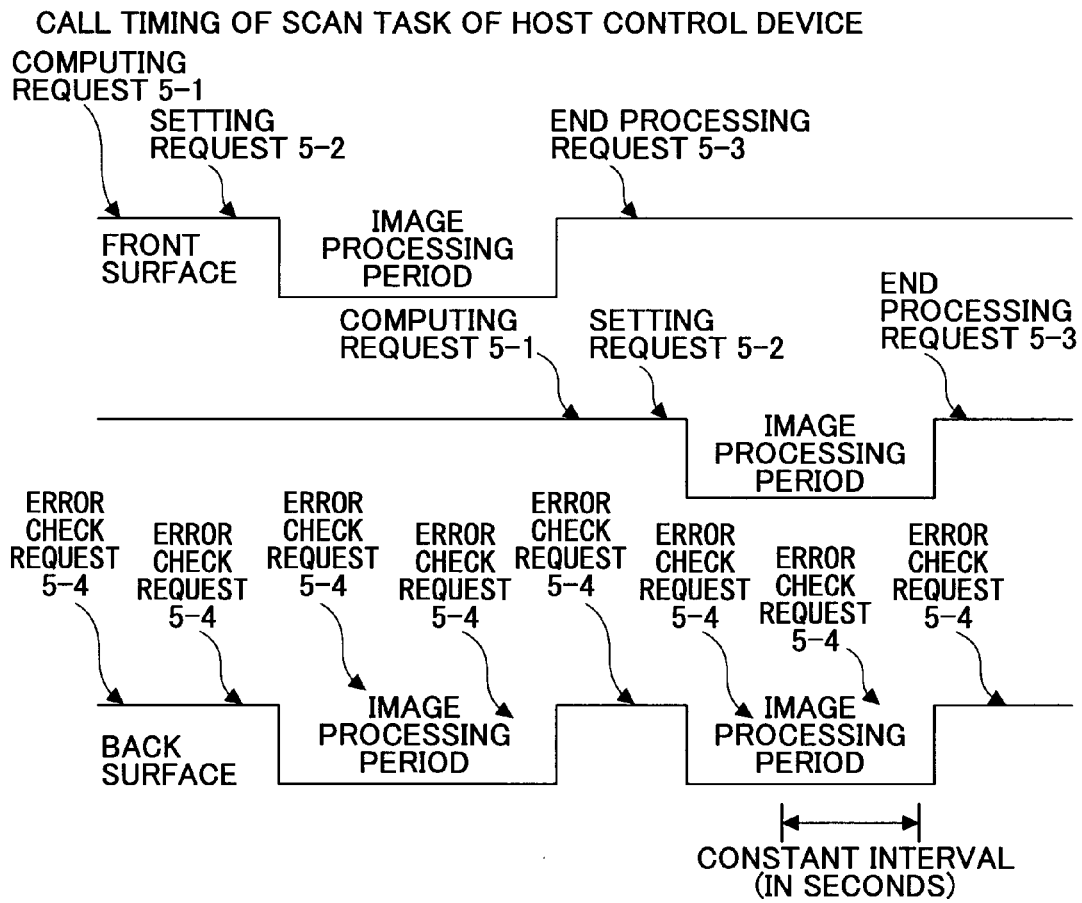
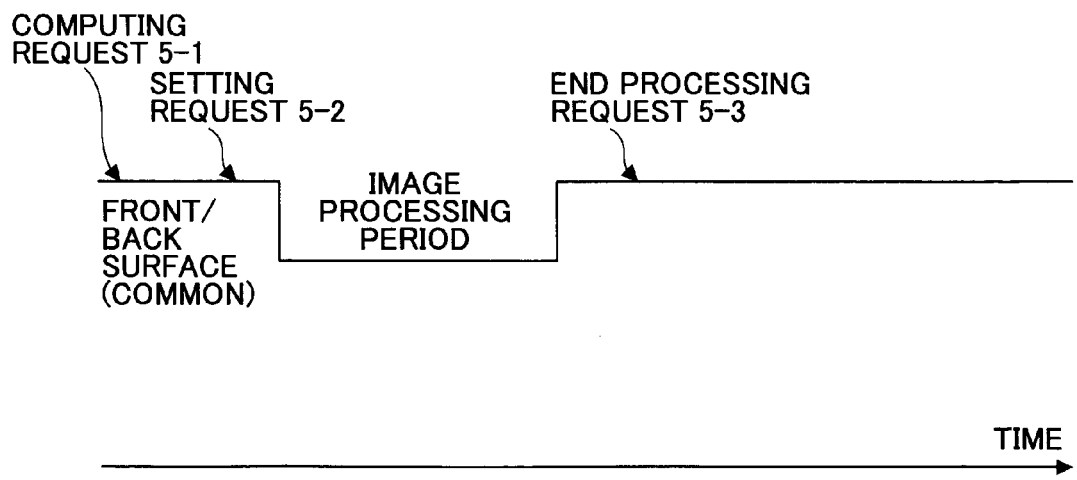

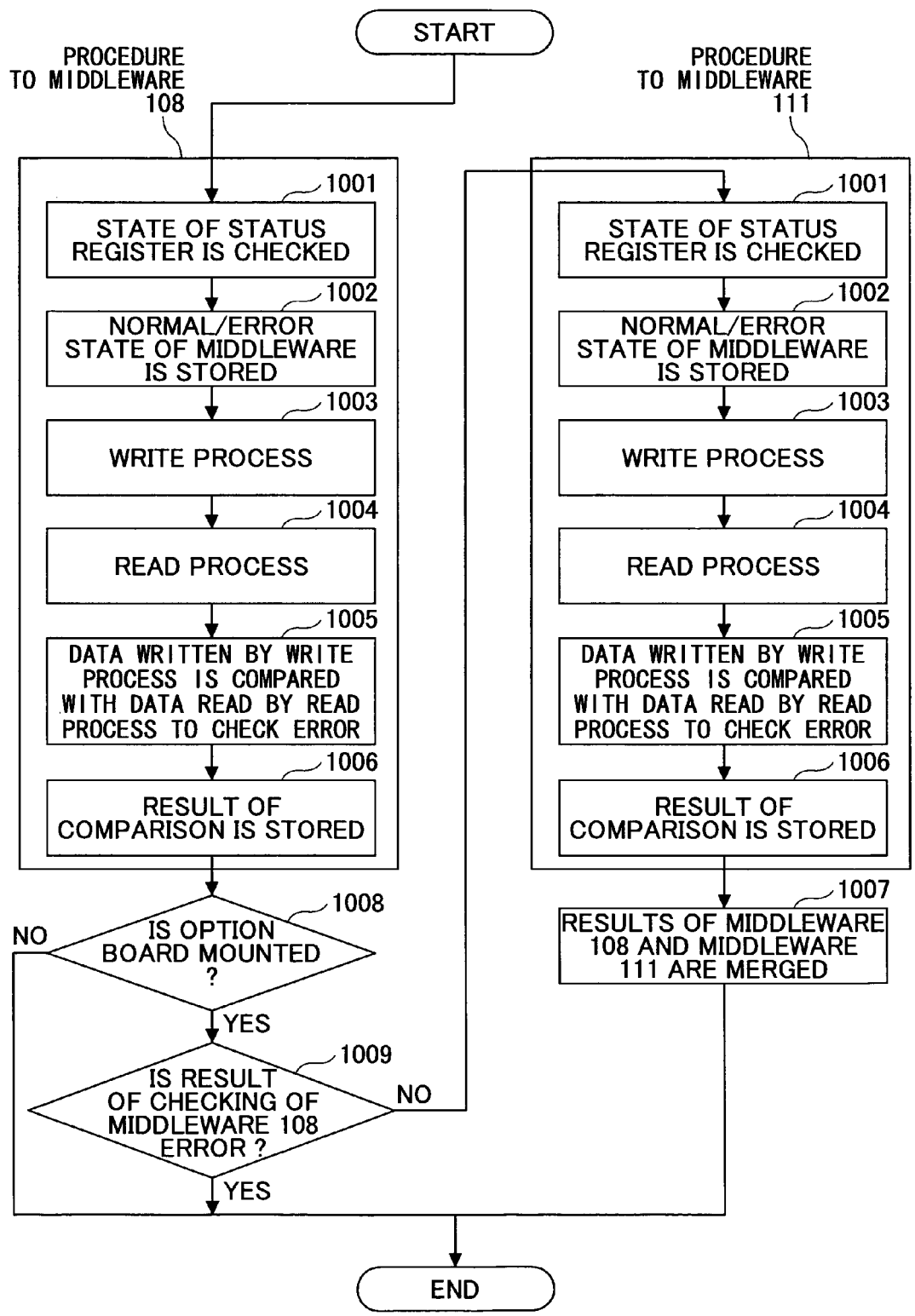

FIG.14

SCALING FACTOR INFORMATION OF OPERATION PANEL
/SCALING INFORMATION OF DOCUMENT
=1/3→A=0
=1/2→A=1
=1/1→A=2

```
const u char Tbl[REQUEST LEVEL 1][A][REQUEST LEVEL 3][2]=[

EXAMPLE:
   FILTERING PROCESS IS CONSTITUTED BY
      PROGRAM A (FOR MAIN-SCAN FILTER),
      PROGRAM B (FOR SUB-SCAN FILTER), AND
      DATA A (INTENSITIES)

```
// PROGRAM CODES
const u long Rip[]={
      /*— PROGRAM A (MAIN-SCAN FILTER) —*/     //VARIATION A
         0x0000040d. 0x0000140d. 0x18030c01. 0x00000000.
         0x0400c010. 0x64c90e00. 0x00000000. 0x38080cc0.
         0x1000c01c. 0xc000c11c. 0x08030c05. 0x04031c05.
         0x00001409. 0x00000409. 0x00000010.
      /*— PROGRAM A (MAIN-SCAN FILTER) —*/     //VARIATION B
         0x0000040d. 0x0000c01c. 0x58080c05. 0x02b40c01.
         0x00000000. 0x0300c002. 0xeccb0e00. 0x00000000.
         0x0000c01c. 0x0100c000. 0x02b40c05. 0xf007c01c.
         0x50b42c01. 0xc2010c05. 0x0100c202. 0x18ec0e00.
         0x00000000. 0xccb01c01. 0x00000000. 0xc6011c05.
         0xe000c01c. 0xc6010c05. 0xbf00c01c.
      /*— PROGRAM B (SUB-SCAN FILTER) —*/     //VARIATION A
         0x0000040d. 0x0000140d. 0x0000240d. 0x0000340d.
         0x0000440d. 0x0000540d. 0x0000640d. 0x0000740d.
         0xff3fc01c. 0xc2010c05. 0x00000000. 0xc2010c01.
         0x00000000. 0xff3fc002. 0xb8c90e00. 0x1000c01c.
         0xce010c05. 0x08000c01. 0x00033c01. 0xc0b00c01.
         0xbab01c01. 0x18030c05. 0x0000c102. 0x08ca0e00.
         0x0000c01c. 0x06020c05. 0x0e033c05. 0x74ca4008.
         0x0100c11c. 0x06021c05. 0x04ca4008. 0x0100c11c.
         0x0000c01c. 0x08021c05. 0x08020c05. 0x08020c05.
         0x08020c05. 0x08020c05. 0x08020c05. 0x08020c05.
         0x08020c05. 0x08020c05. 0x08020c05. 0x08020c05.
                                  :
                                  :

const u short FilB_Tbl[1][3]={
      //DATA A
         5.            //VARIATION A
         8..           //VARIATION B
          :            //VARIATION C
      ]:
```

FIG.16
EXAMPLE: ONE REGISTER CONTAINS ONE WORD (16 BITS)

FILTERING PROCESS IS CONSTITUTED BY
REGISTER A (UPPER 8 BITS; V MATRIX SIZE, LOWER 16 BITS; H MATRIX SIZE),
REGISTER B (16 BITS; FILTER MATRIX SIZE INTENSITIES), AND
REGISTERS C TO Z (EACH 16 BITS; FILTER MATRIX)

```
const u_char FilA_Tbl[3][2]={
// V, H
{3,5},//VARIATION A
{10,10},//VARIATION B
  :
};
const u_short FilB_Tbl[3]={
//INTENSITIES
    5.          //VARIATION A
    8.          //VARIATION B
    :           //VARIATION C
};
const u_char FilC_Tbl[2][10][10]={
      //VARIATION A
      [ 5,20,209,158,183, 0, 0, 0, 0, 0
       98,63,183,134,134, 0, 0, 0, 0, 0
       209,158,5,20,98, 0, 0, 0, 0, 0
        0, 0, 0, 0, 0, 0, 0, 0, 0, 0
        0, 0, 0, 0, 0, 0, 0, 0, 0, 0
        0, 0, 0, 0, 0, 0, 0, 0, 0, 0
        0, 0, 0, 0, 0, 0, 0, 0, 0, 0
        0, 0, 0, 0, 0, 0, 0, 0, 0, 0
        0, 0, 0, 0, 0, 0, 0, 0, 0, 0
        0, 0, 0, 0, 0, 0, 0, 0, 0, 0
      ].
      //VARIATION B
      [ 11,22,123,77,33,214,112,150,207,153,
        77,33,214,112,150,207,153,11,22,123,
        112,150,207,153,11,22,123,77,33,214,
        153,11,22,123,77,33,214,112,150,207,
        123,77,33,214,112,150,153,11,22
        214,112,150,207,153,11,22,123,77,33,
        207,153,11,22,123,77,33,214,112,150,
        22,123,77,33,214,112,150,207,153,11,
        33,214,112,150,207,153,11,22,123,77,
        150,207,153,11,22,123,77,33,214,112
      ].
      //VARIATION C
      [
                         :
      ]
]:
```

IMAGE PROCESSING DEVICE, IMAGE FORMING DEVICE, IMAGE PROCESSING METHOD, IMAGE PROCESSING PROGRAM, AND RECORDING MEDIUM

TECHNICAL FIELD

The invention relates to an image processing device and method which processes digital image data in a digital multifunction peripheral (MFP) having multiple functions, including a copy function, a fax function, a printer function, a scanner function, etc., and relates to an image forming device in which the image processing device is arranged, an image processing method for use in the image processing device, an image processing program, and a recording medium.

BACKGROUND ART

With development of an optical reading device using a line sensor including CCD (charge-coupled device) and an optical writing device using laser irradiation, a digital copier which creates a copy from digital image data appeared. A multifunction peripheral (MFP) having multiple functions, including a copy function, a fax function, a printer function, a scanner function, etc. is put in practical use with the development of the digital copier.

On the other hand, with evolution of the technology relating to the MFP, such as development of hard disk drive (HDD) with large storage capacity and low cost, improvement in the high-speed communication technology and the spread of networking technology, and improvement in the throughput of CPU and the technology of digital image data compression, the functions which are incorporated in the MFP are diversified. The way the MFP is used is also diversified.

For example, such diversified MFP may include: 1) a small-size MFP which is installed beside a PC enabling an operator on the PC to easily use one of the multiple functions including a copy function, a fax function, a printer function and a scanner function; 2) a medium-size MFP which is shared by a number of persons in a company section or department and provides additional functions, such as sorting, punching, stapling, and a certain amount of productivity; and 3) a large-sized MFP which has a high throughput and quality image output provided with various functions and is installed in a company or company section specializing the copy related business.

Although there are some functions which can be used in common for all of the MFP classes, specific functions are demanded for only one of the MFP classes while different functions are demanded for the other MFP classes. For example, for the large-size MFP, not only the post-processing functions, such as punching, stapling and sheet folding functions, but also the electronic filing function simultaneously with the copy function may be demanded. In contrast, for the small-size MFP, the high-quality image printing to recording sheets and the provision of Internet fax and PC fax functions are chiefly demanded for the purpose of personal use.

To meet such demands, the system incorporating the set of functions required for each MFP class was conventionally produced, sold and supplied to the diversified MFP market.

The importance of information in business is already known, and transferring information early and correctly with certainty and notifying information effectively and intelligibly are requested. The provision and merging of new functions are desired for the MFP which deals with digital image data.

Under such situations, the products are provided with multiple functions increasingly, the user is allowed to set up a large number of requests using an operation panel, and an image processor control unit which manages a large number of requests is demanded.

The middleware which will be mentioned hereinafter is implemented on a digital signal processor (DSP) in the MFP, for example. When compared with the hardware (ASIC), the middleware (DSP) enables one of various kinds of image processing programs to be implemented by exchanging the program and data with new ones.

However, as the variation of the image processing increases, the control unit which controls the DSP will have a complicated structure. The countermeasures for the image-processing control with which the specification change can be easily performed must be taken immediately and certainly in response to the specification change. Therefore, it is desired that the existing MFP is arranged to perform the image-processing control which is in conformity with various requests input from the operation panel, and to take countermeasures to the specification change flexibly.

However, the DSP is more expensive than the ASIC (application-specific integrated circuit), and the ASIC is used to take countermeasure to the image processing control in which the specification change does not happen seldom. The device which performs the image processing is selected depending on the usage of the image processing device, and a control unit which controls the image processing device is required.

The image processing which is currently demanded to be arranged in the MFP may include an illegal copy detection process and a bill recognition process. In recent years, similar to the demand for high quality of image, the demand for security is increasingly important. Installing the image recognition functions, such as the illegal copy detection function and the bill recognition function, in the image-processing device in the MFP is becoming the standard equipment.

The bill recognition process which is one of the recognition functions is important in order to inhibit copying of a bill and convert the corresponding image into a non-readable image if the illegal copying of a bill is detected.

Similar to the bill recognition, the illegal copy detection process is also important in order to detect the illegal copying and convert the corresponding image into a non-readable image. And the demand for the illegal copy detection function is diversified increasingly.

If the recognition or the detection is not performed correctly in the recognition process, the subsequent processes following the recognition process will not be performed. One of the reasons the recognition or the detection is not performed correctly may be the defect of the algorithm of the recognition process, which causes the failure of the recognition. Another of the reasons may be that the image-processing device which performs the recognition process does not function correctly and the recognition is impossible.

Some countermeasures that are to be taken when the image-processing device which performs the recognition process does not function correctly and a problem that the recognition is impossible arises are proposed. For example, Japanese Laid-Open Patent Application No. 2005-277841 discloses a method of detecting a device error from an image output from an image-processing device.

Japanese Laid-Open Patent Application No. 2005-045673 discloses a method of performing both detection of an error occurring in an image reader which reads input image data or an image output device which outputs image data, and error notification at a time.

Japanese Laid-Open Patent Application No. 01-125627 discloses a method of performing the device error checking in a hardware monitoring system for a device existing in a network.

However, the methods according to the related art require a lot of operations relating to the device error checking, and they are not appropriate for an image-processing device which operates on real time. In the case of the image-processing device which performs image processing only, it is adequate that the device error checking is performed once. If the image-processing device is used continuously and an error image is output due to the device error, a serviceman may be called so that hardware exchange is performed. After the hardware exchange is performed, the image-processing device can be used again.

However, in the case of the image-processing device which performs the recognition process, such as a bill recognition process or an illegal copy detection process, the print-out image is not influenced when the recognition process does not function correctly due to the device error. In such a case, the image-processing device may be used continuously even if the recognition process does not function correctly.

DISCLOSURE OF THE INVENTION

In one aspect of the invention, the present disclosure provides an improved image processing device and method in which the above-described problems are eliminated.

In one aspect of the invention, the present disclosure provides an image processing device and method which is able to strictly detect whether the image recognition process functions correctly.

In an embodiment of the invention which solves or reduces one or more of the above-mentioned problems, the present disclosure provides an image processing device including a storage unit storing both image data input from a reading unit and relevant information of the image data, a first image-data-processing unit processing both the image data input from the reading unit and image data output to a writing unit, and a second image-data-processing unit detachably attached to the first image-data-processing unit, having an image recognition function and processing the image data input from the reading unit, wherein the first image-data-processing unit comprises: a recognition unit recognizing the input image data; an image processing unit performing image processing based on a result of the recognition by the recognition unit; and a determining unit determining whether operation of the second image-data-processing unit is normal.

In an embodiment of the invention which solves or reduces one or more of the above-mentioned problems, the present disclosure provides an image processing method for use in an image processing device including a storage unit which stores both image data input from a reading unit and relevant information of the image data, a first image-data-processing unit which processes both the image data input from the reading unit and image data output to a writing unit, and a second image-data-processing unit which is detachably attached to the first image-data-processing unit, has an image recognition function, and processes the image data input from the reading unit, the image processing method comprising steps of: recognizing the input image data; performing image processing based on a result of the recognition in the recognizing step; and determining whether operation of the second image-data-processing unit is normal by checking a value of a register indicating a state of the second image-data-processing unit.

The first image-data-processing unit in the data processing device of the embodiment of the invention has the recognition unit recognizing the input image data, and the determining unit determining whether operation of the image recognition function of the second image-data-processing unit is normal, and it is possible to check strictly whether the image recognition process functions correctly.

Other objects, features and advantages of the present invention will become more apparent from the following detailed description when read in conjunction with the accompanying drawings.

BRIEF DESCRIPTION OF THE DRAWINGS

FIG. 3 is a diagram showing a relationship between applications of the multi-function peripheral including the IPU of FIG. 1 and data paths used by the respective applications.

FIG. 5 is a diagram showing a call timing of the host control device and the image processor control unit.

FIG. 10 is a flowchart for explaining the procedure performed by the image processor control unit in response to an error check setting request.

FIG. 14 is a diagram showing an example of the image-processing parameter used in this embodiment.

FIG. 15 is a diagram showing an example of the parameter set in the middleware.

FIG. 16 is a diagram showing an example of the parameter set in the hardware.

BEST MODE FOR CARRYING OUT THE INVENTION

A description will be given of embodiments of the invention with reference to the accompanying drawings.

Figure 1:
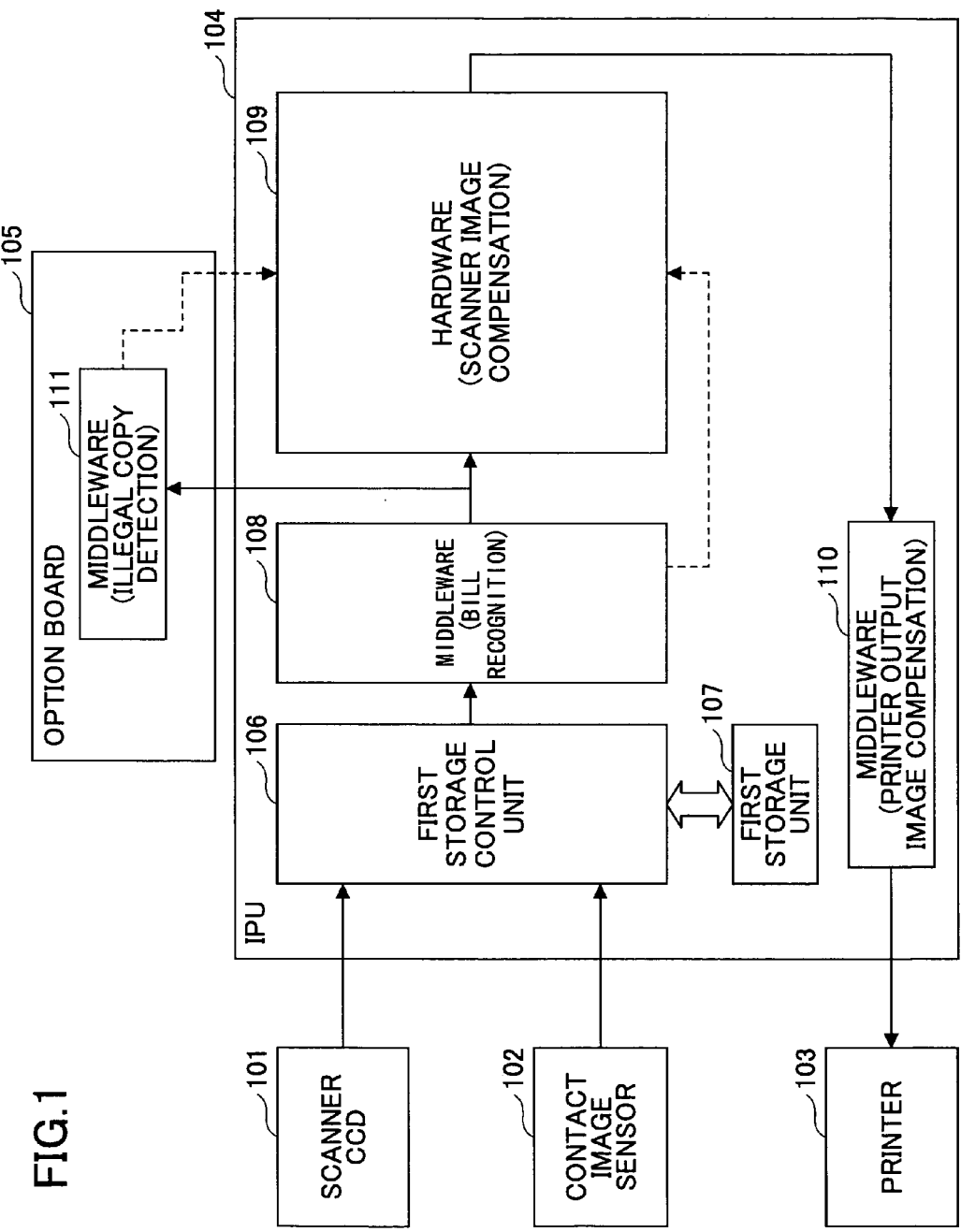
FIG. 1 is a block diagram showing the composition of an image processor unit (IPU) of an embodiment of the invention.

FIG. 1 shows the composition of an IPU (Image Processor Unit) 104 of an embodiment of the invention for use in a multi-function peripheral (MFP). The IPU 104 includes a first storage control unit 106, a first storage unit 107, middleware (bill recognition) 108, and hardware (scanner image compensation) 109.

Image data obtained when both sides (front and back surfaces) of a document are read by a scanner CCD 101 and by a contact image sensor 102 are input to the first storage control unit 106. The first storage control unit 106 controls writing of the image data to the first storage unit 107, reading of the image data from the first storage unit 107, compression of the image data, decompression of the image data, etc.

The IPU 104 has the composition arranged to be connected to the scanner CCD 101 and the contact image sensor 102 as the image reading units, corresponding to double-side printing as shown in FIG. 1. Alternatively, the composition arranged to be connected to the scanner CCD 101 only may be used for the IPU.

The hardware (ASIC) 109 for performing a scanner image compensation process, the middleware (DSP) 108 for performing a bill recognition process, and the middleware (DSP) 110 for a printer output image compensation process are used in the IPU 104 as the image-data-processing units.

Some users desire to use an illegal copy detection function but others do not desire to use it. For this reason, the IPU 104 has the middleware (DSP) 111 which performs an illegal copy detection process which is provided as an option board 105 that is detachably attached to the hardware 109 and can be detached.

The image processing device (IPU) of this embodiment controls only the hardware (ASIC) 109, the middleware 108, the middleware 110, and the middleware 111. Other image processor control units arranged in the MFP control and manage the first storage control unit 106, storage of images to the first storage unit 107, and the timing of inputting and outputting of image data to the image-data-processing units (the middleware 108,110,111, the hardware 109).

The image processing device (IPU) of this embodiment sets up the image-processing parameter so that the optimal image processing may be performed by each of the image-data-processing units 108,109,110,111 before starting the image processing of the image data sent to the hardware 109 and the middleware 108,110,111.

In FIG. 1, the arrow of the solid line indicates the flow of image data, and the arrow of the dotted line indicates the flow of an interrupt signal indicating a detection result.

In the illegal copy detection of this embodiment, the function of converting the corresponding image into a non-readable image (or a smeared-away image) if it is detected as an illegal copy is used. Because the interrupt signals from the middleware 108 and the middleware 111 are input to the hardware 109, the process of smearing the image away into a non-readable image is performed by the hardware 109 depending on the result of bill recognition and the result of illegal copy detection.

Figure 2:
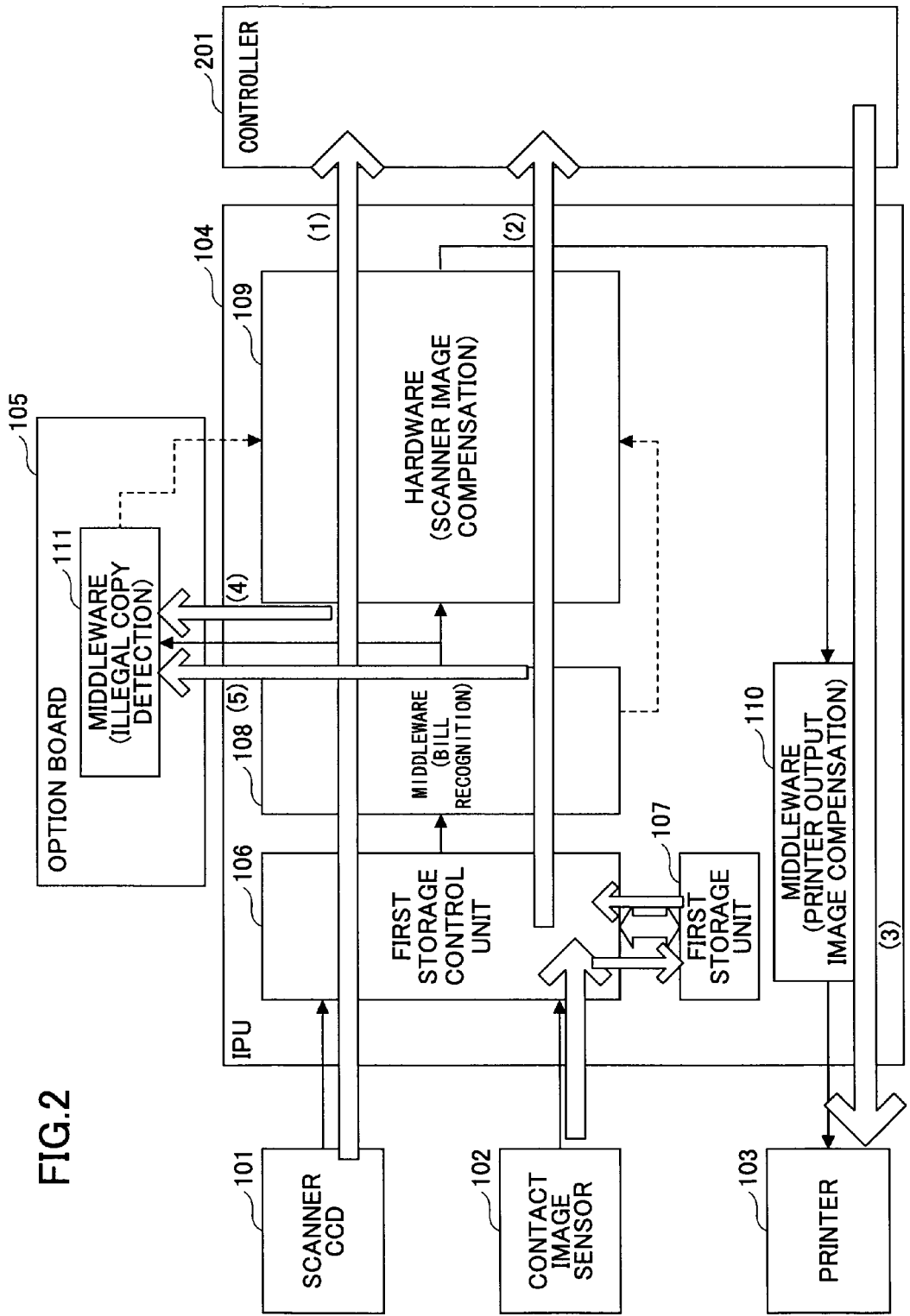
FIG. 2 is a diagram showing a flow of image data in the IPU of FIG. 1.

FIG. 2 shows the flow of image data in the IPU 104 of FIG. 1. Suppose that four kinds of applications providing a copy function, a scanner function, a fax function, and a printer function, are usable in the MFP in this embodiment. FIG. 2 shows the flow of the image data for each function.

FIG. 3 shows a relationship between the applications and the data paths used by the respective applications. The data path indicated by the number in parentheses in FIG. 2 corresponds to the data path indicated by the number in parentheses in FIG. 3.

As shown in FIG. 2 and FIG. 3, the data path (1) for the copy function in the case of single-side printing is as follows. The image data input from the scanner CCD 101 is sent to the middleware 108 (which is an image-data-processing device) via the first storage control unit 106, and the bill recognition process is performed by the middleware 108. The image data from the middleware 108 is further sent to the hardware 109 and the scanner image compensation process is performed by the hardware 109, and the processed image data is sent to the controller 201. This data path is indicated by (1) in FIG. 2 and FIG. 3.

The data path (3) for the copy function in the case of single-side printing is as follows. Namely, the image data from the controller 201 is sent to the middleware 110 (which is an image-data-processing device) in the IPU 104, and the printer output image compensation process is performed by the middleware 110. The processed image data from the middleware 110 is sent to the printer 103 so that a printout image is output to a recording sheet. This data path is indicated by (3) in FIG. 2 and FIG. 3.

For the copy function in the case of double-side printing, the image data path (2) with respect to a back-surface image of a document is added to the image data paths (1) and (3) for the copy function in the case of single-side printing mentioned above.

The middleware 108 and the hardware 109 cannot perform image processing of the image data input from the scanner CCD 101 and image processing of the image data input from the contact image sensor 102 simultaneously at a time. For this reason, the image data input from the contact image sensor 102 is temporarily stored in the first storage unit 107 by using the control of the first storage control unit 106, during the period until the image processing of the input image data of the scanner CCD 101 is completed by the hardware 109.

After the image processing of the input image data of the scanner CCD 101 is completed, the image data read from the first storage unit 107 is sent to the middleware 108 via the first storage control unit 106 again, and the bill recognition process is performed by the middleware 108. The image data from the middleware 108 is further sent to the hardware 109 and the scanner image compensation process is performed by the hardware 109, and the processed image data is sent to the controller 201. This data path is indicated by (2) in FIG. 2 and FIG. 3.

Figure 4:
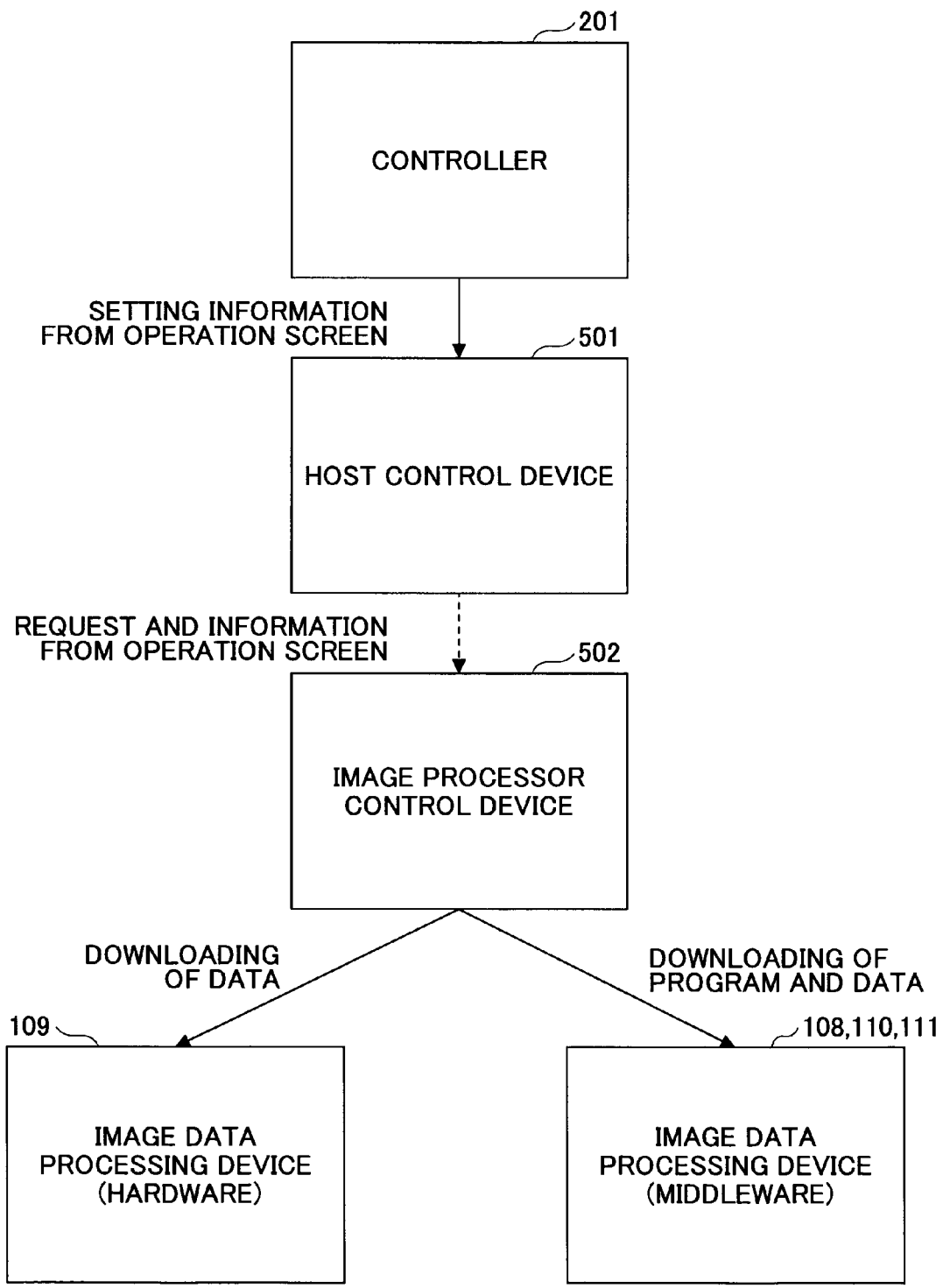
FIG. 4 is a block diagram showing a relationship between a controller, a host control device, and an image processor control unit.

FIG. 4 shows a download composition. As is apparent from FIG. 2, the image data path from the controller 201 to the printer 103 is as follows. The input image data of the scanner CCD 101 is first sent to the middleware 110, and the printer output image compensation process is performed by the middleware 110. After the processed image data is sent to the printer 103, the same procedure is performed for the input image data of the contact image sensor 102. Then, the images for double-side printing are output.

The components of the MFP other than the controller 201 may be referred to as an engine. The controller 201 is controlled by a CPU arranged in the controller 201, and the engine is controlled by a CPU arranged in the engine.

In the composition of FIG. 4, the image processor control unit 502 and the host control unit 501 which calls the image processor control unit 502 are constituted by the function of the engine CPU. Each control unit is configured by using the software.

Specifically, the image processor control unit 502 is control software and its process is performed by the engine CPU. The data for the hardware 109 and the data for the middleware 108,110,111 are held in the memory which can be accessed by the engine CPU, and the data to be downloaded is determined by the engine CPU by making reference to these data in the memory.

In the engine, the calling module and the called module are explicitly defined. The host control unit 501 may call the image processor control unit 502. However, the host control unit 501 may not be called by the image processor control unit 502. This is because the control unit 501 is referred to as the host control unit 501.

The data paths for the scanner function and the fax (transmission) function are the image data path (1) in the case of single-side reading, and the image data paths (1) and (2) in the case of double-side reading. In this case, the image data for which the image processing was performed by the middleware 108 and the hardware 109 is sent to the controller 201, so that it is transmitted to a client PC or a printer which are connected to a network, such as LAN.

Regarding the data path for the printer function and the fax (reception) function, there is no distinction between single-side printing and double-side printing. This data path is the image data path (3). The image data from the controller 201 is sent to the middleware 110, and the printer output image compensation process is performed by the middleware 110. The processed image data from the middleware 110 is sent to the printer 103, so that a printout image is output to a recording sheet.

Similar to the transmission of the image data from the first storage control unit 106 to the middleware 108 and the hardware 109, the same image data is also sent to the middleware 111 of the option board 105. Therefore, the image data path (4) is added at the time of inputting the image data from the scanner CCD 101, and the image data path (5) is added at the time of inputting the image data from the contact image sensor 102.

When an illegal copy is detected by the middleware 111, the corresponding image data is automatically converted into a non-readable image by setting the hardware 109 of the IPU 104, and the image data of the smeared-away image is sent to the controller 201. When any illegal copy is not detected, the setting of the hardware 109 is not performed, and the corresponding image data is sent to the controller 201.

At the time of double-side reading, illegal copy detection of both the input image data of the scanner CCD 101 and the input image data of the contact image sensor 102 is performed by the middleware 111 solely. For this reason, the image data of the scanner CCD 101 is first sent to the middleware 111. The image data of the contact image sensor 102 is temporarily stored in the first storage unit 107 using the first storage control unit 106, and the image processing for the image read by the scanner CCD 101 is performed. After the processed image data is sent to the controller 201, the image data read from the first storage unit 107 is sent to the middleware 111 and the hardware 109. Then, the image processing is performed and the processed image data is sent to the controller 201.

Operation of the middleware 108 which performs the bill recognition process is essentially the same as operation of the middleware 111 which performs the illegal copy detection process described above. When the input image is recognized as being a bill by the middleware 108, the corresponding image data is automatically converted into a non-readable image by setting the hardware 109, and the image data of the smeared-away image is sent to the controller 201. When the input image is recognized as not being a bill, the setting of the hardware 109 is not performed, and the corresponding image data is sent to the controller 201 without changing the input image.

At the time of double-side reading, bill recognition of both the input image data of the scanner CCD 101 and the input image data of the contact image sensor 102 is performed by the middleware 108 solely. The image data from the scanner CCD 101 are first sent to the controller 201. The image data from the contact image sensor 102 is temporarily stored in the first storage unit 107 using the first storage control unit 106, and the image processing for the image read by the scanner CCD 101 is performed. After the processed image data is sent to the controller 201, the image data read from the first storage unit 107 is sent to the middleware 108 and the hardware 109. Then, the image processing is performed and the processed image data is sent to the controller 201.

When it is set up that if at least one of the result of bill recognition and the result of illegal copy detection is affirmative the corresponding image is to be converted into a non-readable image, the image data sent to the controller 201 is set to the image data of a smeared-away image.

FIG. 4 shows the relationship between the controller 201, the host control device 501, and the image processor control unit 502.

Figure 13:
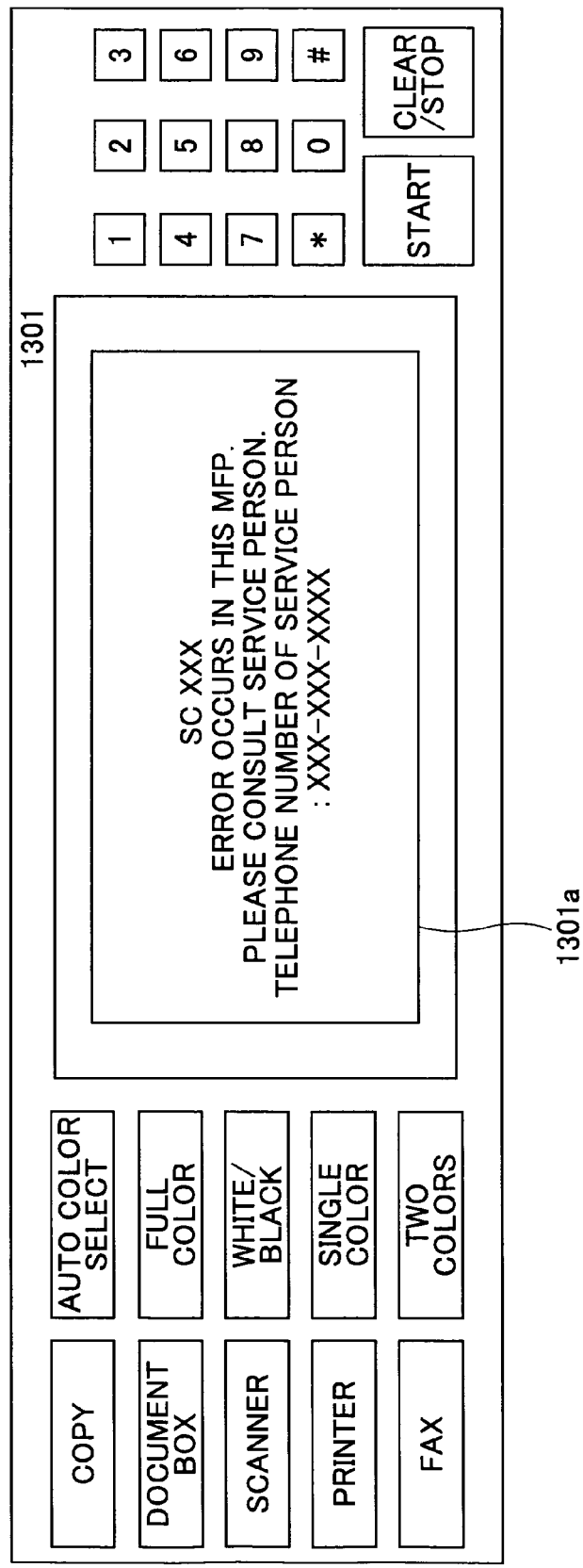
FIG. 13 is a diagram showing a display message of an operation screen of an operation panel.

The setting information specified by the user on the operation screen (user interface) of the operation panel provided in the controller 201 is transmitted to the image processor control unit 502 via the host control device 501. Although the contents of the operation screen are not illustrated, the setting information which may be specified by the user is displayed on the operation screen (touch panel) 1301*a* of the operation panel 1301 as shown in FIG. 13. Thus, the user can input desired setting information by touching the operation screen.

The image processor control unit 502 receives the setting information (document mode, a scaling factor, optical density setting, etc.) specified by the user from the host control unit 501, and transmits the program and data to any of the hardware 109 and the middleware 108, 110, 111 which are the image-data-processing devices to be controlled. Setting of the image-processing parameter is controlled so that the optimal image for the user may be output.

The middleware 111 is provided in the option board 105. For this reason, setting of the image-processing parameter for the middleware 111 is performed only at the time of mounting of the option board 105.

The host control device 501 controls the transmission of the user information specified by the user on the operation screen, and the read-out timing for the image processor control unit 502 to implement the image processing. The image processor control unit 502 switches the image processing in accordance with the request which is called by using the read-out as a trigger.

FIG. 5 shows a call timing of the host control unit 501 and the image processor control unit 502.

The operation of the host control unit 501 is divided for every task, and the image processor control unit 502 performs setting of scanner input and plotter output which requires image processing as shown in FIG. 5. Thus, the sources of setting requests are two processes: a scanner process and a plotter process.

Figure 6:
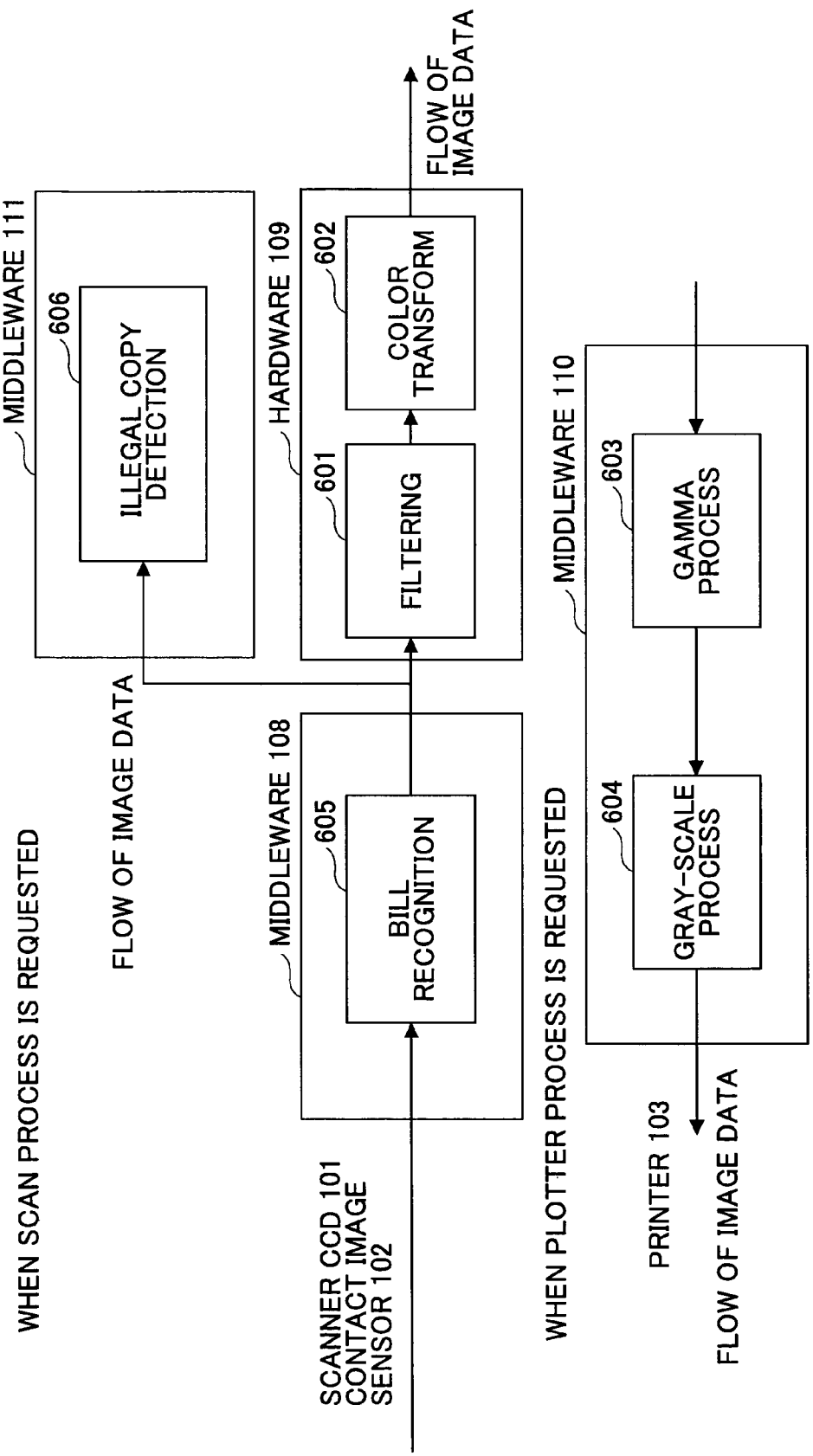
FIG. 6 is a block diagram showing the composition of the image-processing module in the hardware and the middleware.

In the composition of the IPU 104 of the MFP, the scanner process and the plotter process are performed by different image-data processing devices. As shown in FIG. 6, request timing may overlap between a scanner process request and a plotter process request.

The image processor control unit 502 manages the unit of one image processing as a process, and the control action within one process is completed by a computing request 5-1, a setting request 5-2, and an end setting request 5-3.

The computing request 5-1 is to compute an image-processing parameter and hold the image-processing parameter to be set in an image-data-processing device. The setting request 5-2 is to set the content of the image-processing parameter which was computed and held beforehand in the image-data-processing device. The end setting request 5-3 is to perform a post-processing so as to avoid occurrence of memory leaking, such as leaking of the computation result being held.

In a case of a front-surface image processing request only, the scanner process sends the computing request 5-1 and the setting request 5-2 before the image-data-processing device starts performing image processing, to set the image-data-processing device in a ready state to perform the image processing, and sends image data to the image-data-processing device so that the image processing is performed. Then, the scanner process sends the end setting request 5-3, and the control action within one process is completed by the image processor control unit 502.

In a case of a double-sided image processing request, the image processor control unit 502 is requested to further perform a similar control action for a back-surface image processing, in addition to the control action for the front-surface image processing request.

The plotter task is essentially the same as the scanner task. However, the image-data-processing device to be set up and the device which performs image processing are different from those in the scanner task.

The image processor control unit 502 provides the host control unit 501 with the method setting as another interface with the process setting of these scanner and plotter tasks. The method setting may be requested at any timing irrespective of the image processing period.

In this embodiment, the method setting is called for an image-data-processing device error checking of the middleware 108 or the middleware 111 which performs recognition processing. The middleware 108 or 111 which performs recognition processing is arranged at the position following the first storage control unit 106 and used as an image-data-processing device in common for both the front-surface and back-surface image processing. For this reason, a device error check request 5-4 is always sent to the image processor control unit 502 from the host control unit 501 at a constant interval.

The middleware 110 which does not perform recognition processing is arranged as an image-data-processing device on the side of the plotter task, and the method setting is never requested.

FIG. 6 shows the composition of the image-processing module in the hardware 109 and the middleware 108, 110 or 111. The hardware 109 and the middleware 108, 110 or 111 are the image-data-processing devices mounted in the IPU of the MFP of this embodiment.

The hardware 109 includes a filtering process 601 and a color transform process 602 in order to compensate for the image data input from the scanner CCD 101 and the contact image sensor 102.

The filtering process 601 is a process for compensating for the image data in order for emphasizing edges or removing noises, or bringing the MTF characteristics close to the input image data of the scanner CCD 101 and the contact image sensor 102.

In the copy function, the color transform process 602 transforms the color signals the RGB input image data into CMYK output color signals.

The middleware 110 is an image-data-processing device provided for the printer 103. The middleware 110 includes a gamma process 604 and a gray-scale process 604. The gamma process 603 performs the gamma process according to the printer characteristics, and the gray-scale process 604 performs gray-scale conversion to make the number of gray-scale levels for the output image suitable for the number of gray-scale level for the input image.

The middleware 108 includes a bill recognition process 605 which is mounted to perform bill recognition.

The middleware 111 which is additionally arranged on the option board 105 is an image-data-processing device which is mounted for performing an illegal copy detection process 606.

When a scanner process is requested, the bill recognition process 605 and the illegal copy detection process 606 are performed to the input image data of the scanner CCD 101 or the contact image sensor 102. Both the modules 605 and 606 are the modules which are to be controlled at the time of a scanner process. In this embodiment, the image processor control unit 502 controls the six image-data-processing modules 601-606 mentioned above.

Figure 7:
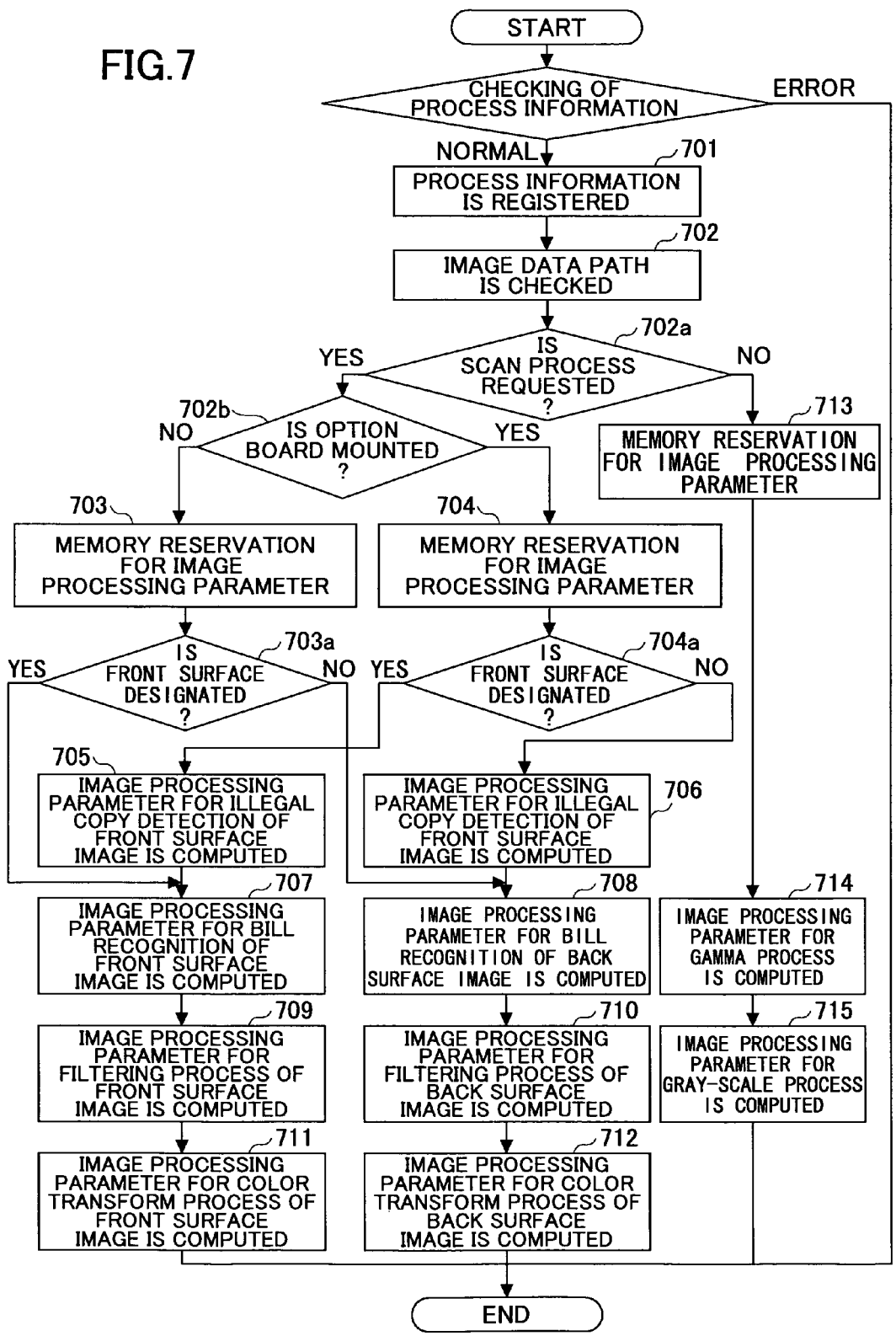
FIG. 7 is a flowchart for explaining the procedure performed by the image processor control unit in response to a computing request.

FIG. 7 is a flowchart for explaining the procedure performed by the image processor control unit 502 in response to a computing request.

The procedure of FIG. 7 is performed by the image processor control unit 502 when a computing request from the host control unit 501 is received at the image processor control unit 502. First, the image processor control unit 502 receives a request from any of the two or more scanner processes and the two or more plotter processes. Because the scanner process and the plotter process are different tasks, a task switching may take place during a scanner process such that the scanner process is shifted to a plotter process and then the plotter process is shifted to the scanner process again.

The image processor control unit 502 manages the process information for the scanner processes and manages the process information for the plotter processes independently of each other, in order to manage the plural scanner processes and the plural plotter processes respectively. The process retrieval processing searches the process information which is already called and registered in the image processor control unit 502. The results of the searching include the kind of the process concerned (scanning process or printing process) and the process number identifying the process concerned.

Upon start of the procedure of FIG. 7, the process information is searched (step 701). When the computing request includes the process number and the process kind which are the same as those of the registered processes, it is determined that an error arises. The procedure is terminated without performing further processing.

On the other hand, when the computing request is normal, not an error, the process kind and the process number thereof are registered as the process information (step 701).

Although the number of the modules which are controlled by the image processor control unit 502 is six, the modules to be processed are predetermined for each of the scanner processes and the plotter processes. The image data path is checked and it is determined whether the requesting source is the scanner process or the plotter process (steps 702, 702a). As a result, the modules to be subjected to image processing are determined and the computation of only the minimum number of the modules is performed.

When the requesting source is the scanner process, it is necessary to compute the image-processing parameters of the filtering process 601, the color transform process 602 and the bill recognition process 605. In order to reserve the memory areas for storing the computation results, the image-processing parameter memory reservation of bill recognition process, filtering process and color conversion process is performed (step 703).

Even when the requesting source is the scanner process, there may be two cases: the case where the option board 105 is mounted and the case where the option board 105 is not mounted (step 702*b*). Only when the option board 105 is mounted, the next step 704 is performed. In the step 704, the memory reservation required for computation of the illegal copy detection process 606 is performed. When the option board 105 is not mounted, the step 703 is performed.

After the step 703 or 704 is performed, it is determined whether the front surface of a printing sheet is designated (step 703*a* or 704*a*). When the option board 105 is mounted and the front surface is designated, the next step 705 is performed. In the step 705, the image-processing parameter computation for the illegal copy detection process for the front surface is performed. When the option board 105 is mounted and the back surface is designated, the next step 706 is performed. In the step 706, the image-processing parameter computation for the illegal copy detection processing for the back surface is performed. The image-processing parameter computation for the filtering process 601, the color transform process 602 and the bill recognition process 605 is always performed, irrespective of whether the option board 105 is mounted or not.

When the requesting source is the scanner process and the option board 105 is not mounted, it is also determined in the step 703*a* whether it is the image surface of the input of the contact image sensor 102 or the image surface of the input of the scanner CCD 101. According to the result of the determination, either the image-processing parameter computation for the bill recognition process for the front surface (step 707) or the image-processing parameter computation for the bill recognition process for the back surface (step 708) is performed.

Similarly, either the image-processing parameter computation for the filtering process for the front surface (step 709) or the image-processing parameter computation for the filtering process for the back surface (step 710) is performed. Thereafter, either the image-processing parameter computation for the color transform process for the front surface (step 711) or the image-processing parameter computation for color transform process for the back surface (step 712) is performed.

The results of the computations are stored in the memory reserved at the step 703 for the image-processing parameters of the filtering process 601, the color transform process 602 and the bill recognition process 605, and the procedure is terminated.

When the requesting source is the plotter process, the difference in the characteristics of the image data between the front surface image and the back surface image is compensated by the image processing of the scanner process, and it is not necessary to shift the image processing on the side of the plotter task. The modules needed to perform the image processing in this case are predetermined as being the gamma process 603 and the gray-scale process 604. In order to reserve the memory areas for storing the computation results, the image-processing parameter memory reservation of the gamma process and the gray-scale process is performed (step 713). Subsequently, the image-processing parameter computation for the gamma process is performed (step 714), and the image-processing parameter computation for the gray-scale process is performed (step 715). The results of the computations are stored in the reserved memory and the procedure is terminated.

Figure 8:
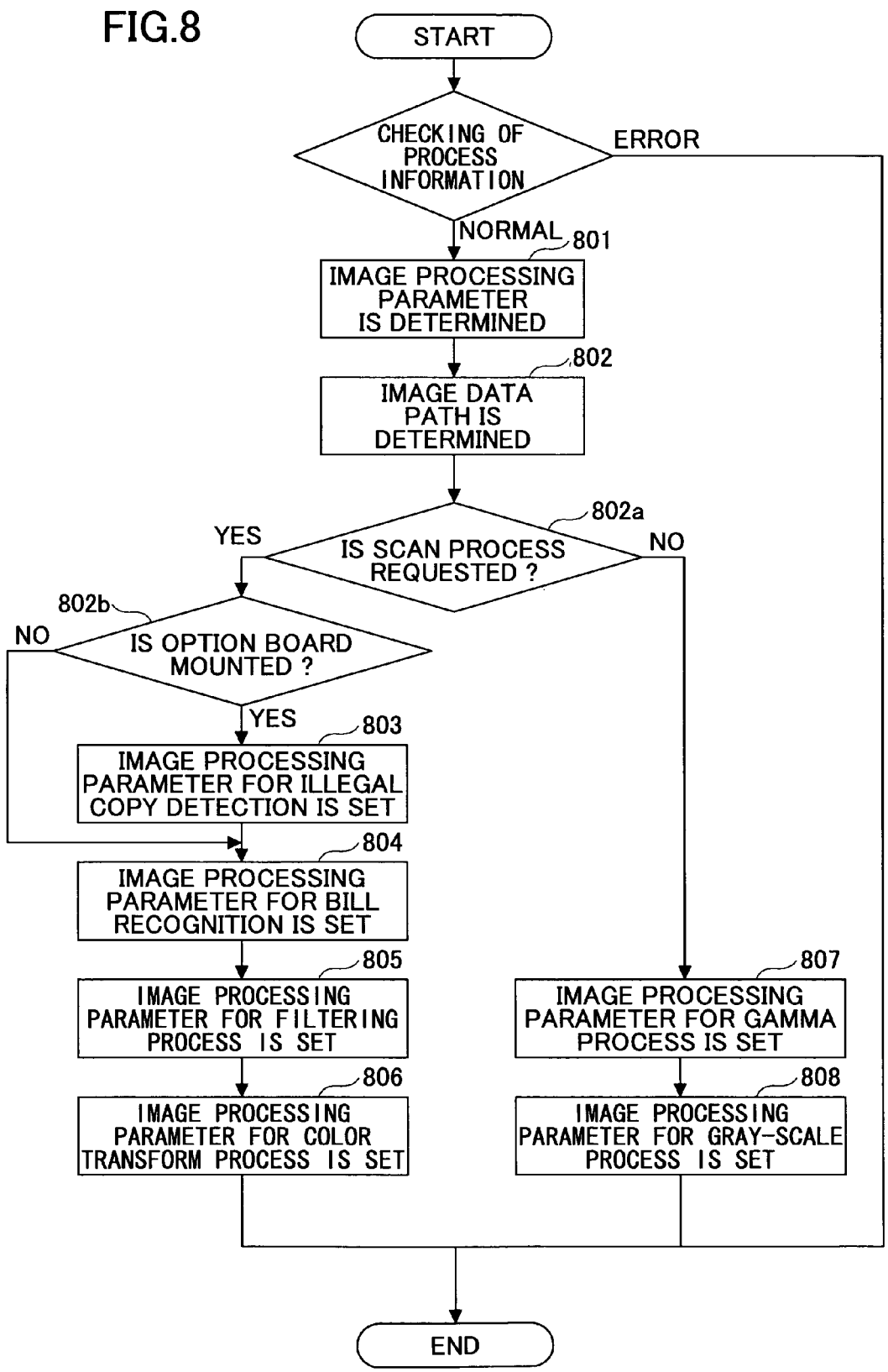
FIG. 8 is a flowchart for explaining the procedure performed by the image processor control unit in response to a setting request.

FIG. 8 is a flowchart for explaining the procedure performed by image processor control unit 502 in response to a setting request. Setting processing is requested in order to set the computed image-processing parameters to the image-processing device.

For this reason, if the setting procedure is performed during the image processing, the image processing may not be performed normally and an erroneous image may be output. To avoid this, it is necessary to set the parameters only in the image-processing device in which the image-processing module of the requested process is arranged.

The control procedure for the setting request is essentially the same as the procedure for the computing request. Upon start of the procedure of FIG. 8, the process information managed by the image processor control unit 502 is searched by the process retrieval to determine whether the setting request includes the process number and the process kind which are the same as those of the registered processes in the process information. When they do not exist in the process information, it means that the setting request was called before receiving the computing request (or an error). In this case, the procedure is terminated without performing further processing.

On the other hand, when they exist, the setting request is normal and the control progresses to step 801. In the step 801, the image-processing parameter is determined from the process information, in order to identify the process which has computed the image-processing parameter.

Subsequently, the requested process is identified and the image data path is determined (steps 802, 802*a*, 802*b*). The setting is performed in accordance with the determined image data path.

When the requesting source is the scanner process, it is determined whether the option board 105 is mounted, depending on the result of the image data path determined at the time of receiving the computing request. Only when the option board 105 is mounted, the image-processing parameter setting for the illegal copy detection process is performed (step 803).

Irrespective of whether the option board 105 is mounted or not, the image-processing parameter setting for the bill recognition process (step 804), the image-processing parameter setting for the filtering process (step 805), and the image-processing parameter setting for the color transform process (step 806) are performed. From the information of the image-processing parameter that is stored in the memory, reserved at the time of receiving the computing request, in which the computation results are stored, the setting of the image processing parameter for the bill recognition process 605, the filtering process 601 and the color transform process 602 is performed according to the contents stored.

When the requesting source is the plotter process, the image-processing parameter setting for the gamma process (step 807), and the image-processing parameter setting for the gray-scale process (step 808) are performed. The setting of the image processing parameter for the gamma process 603 and the gray-scale process 604 is performed according to the stored contents from the information of the image-processing parameter that is stored in the memory, reserved at the time of receiving the computing request, in which the computation results are stored.

Figure 9:
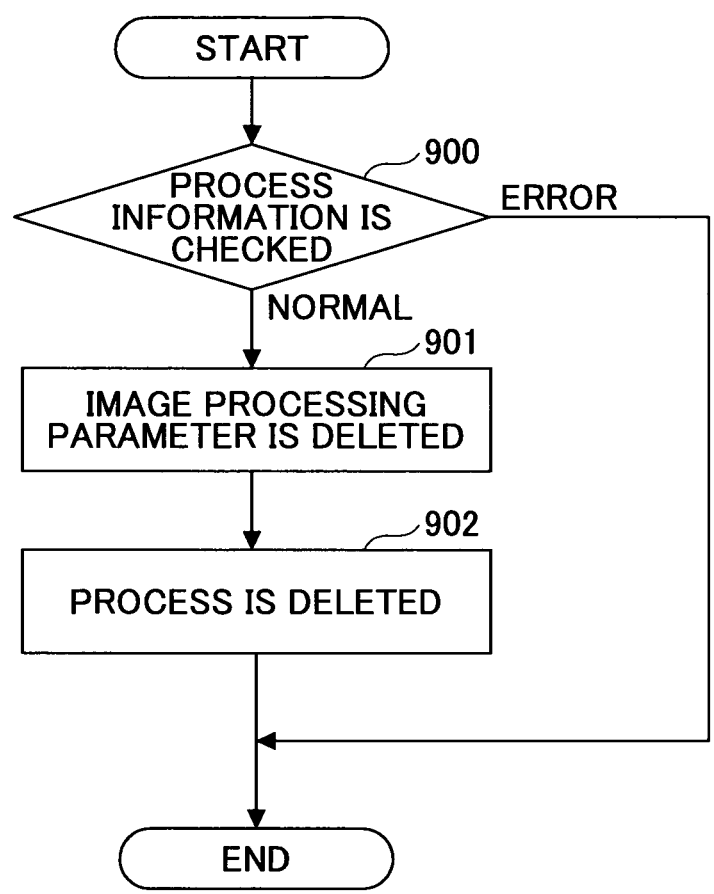
FIG. 9 is a flowchart for explaining the procedure performed by the image processor control unit in response to an end setting request.

FIG. 9 is a flowchart for explaining the procedure performed by the image processor control unit 502 in response to an end setting request.

In the end setting, the release processing of the process information which is registered at the time of receiving the computing request and managed by the image processor control unit 502, as well as of the memory reserved within the process for storing the image-processing parameter is performed.

First, the process information is searched (step 900) to determine whether the end setting request includes the process number and the process kind which are the same as in the process information (those at the storage location where the corresponding one of the scanner processes or the plotter processes).

When they do not exist in the process information, it means that the end setting request was called before receiving the computing request (or an error). In this case, the procedure is terminated without performing further processing.

When they exist, the end setting request is normal and the control progresses to step 901. In the step 901, the process in which the image-processing parameter is computed and set up is determined from the process information, and the memory releasing is performed by deleting the image-processing parameter.

Subsequently, the releasing processing of the process information which is identified by the deletion of the image-processing parameter is completed, and the process is deleted (step 902). The procedure is then terminated.

FIG. 10 is a flowchart for explaining the procedure performed by the image processor control unit 502 in response to an error check setting request.

In this embodiment, when image processor control unit 502 receives an error check setting request from the host control unit 501, the device error checking of both the middleware 108 and the middleware 111 (which perform the recognition type image processing) is performed.

The IPU 104 is arranged so that the middleware 108 which performs the bill recognition process is always carried. The image processor control unit 502 determines whether the device error checking of the middleware 111 which performs the illegal copy detection process is to be performed, based on the mounting information of the option board 105.

Because the procedure to the middleware 108 and the procedure to the middleware 111 are essentially the same, a description will be given of only the procedure to the middleware 108.

In order to allow the CPU (eSOC) of the image processor control unit 502 to access the data transmission/reception register and the status register of the middleware 108 which performs the bill recognition process, specific addresses of the memory space are assigned. In this embodiment, suppose that the address A and the address B are assigned by volatile declaration respectively.

First in the procedure to the middleware 108, in the state checking of the status register (step 1001), the image processor control unit 502 determines that the state of the middleware is indicated by a normal value, by making reference to the value of the address B.

In the error determination (step 1002) by the status register, a normal/abnormal state of the middleware 108 is stored.

Next, the write process 1003 is performed to the address A and the dummy data for the device error checking is written in the middleware 108 (step 1003).

In order to check whether the write process is performed normally, the read process is performed (step 1004) after the write process. In the read process, the dummy data written to the address A by the write process (step 1003) is read from the middleware 108.

Subsequently, in the error determination by the write/read process (step 1005), the dummy data written by the write process (step 1003) is compared with the value read from the middleware 108 by the read processing (step 1004). Thereby, it is determined whether matching (normal) or non-matching (error) occurs. The result of the comparison is stored (step 1006). The device error checking is completed.

The same procedure is performed also to the middleware 111 which performs the illegal copy detection process. In step 1008, it is checked whether the option board 105 is mounted. In step 1009, it is checked whether the stored result of the comparison indicates an error state. Only when the option board 105 is mounted and the stored result indicates a normal state, the procedure to the middleware 111 is also performed.

When the middleware 108 which performs the bill recognition process is in the error state, even if the middleware 111 which performs the illegal copy detection process is in the normal state, the system as a whole is in the error state. In such a case, it is necessary to suspend the system. Thus, the procedure is terminated in order to avoid performing the unnecessary processing.

Only when the middleware 108 which performs the bill recognition process is in the normal state, the device error checking procedure to the middleware 111 which performs the illegal copy detection process is performed also in the manner that is the same as that of the middleware 108 is performed, and the similar result is obtained.

Merging of the results of the middleware 108 and the middleware 111 is performed (step 1007). When it is determined that at least one of the middleware 108 and the middleware 111 is in the error state, the error result is returned back to the host control device 501 by the image processor control unit 502.

Figure 11A:
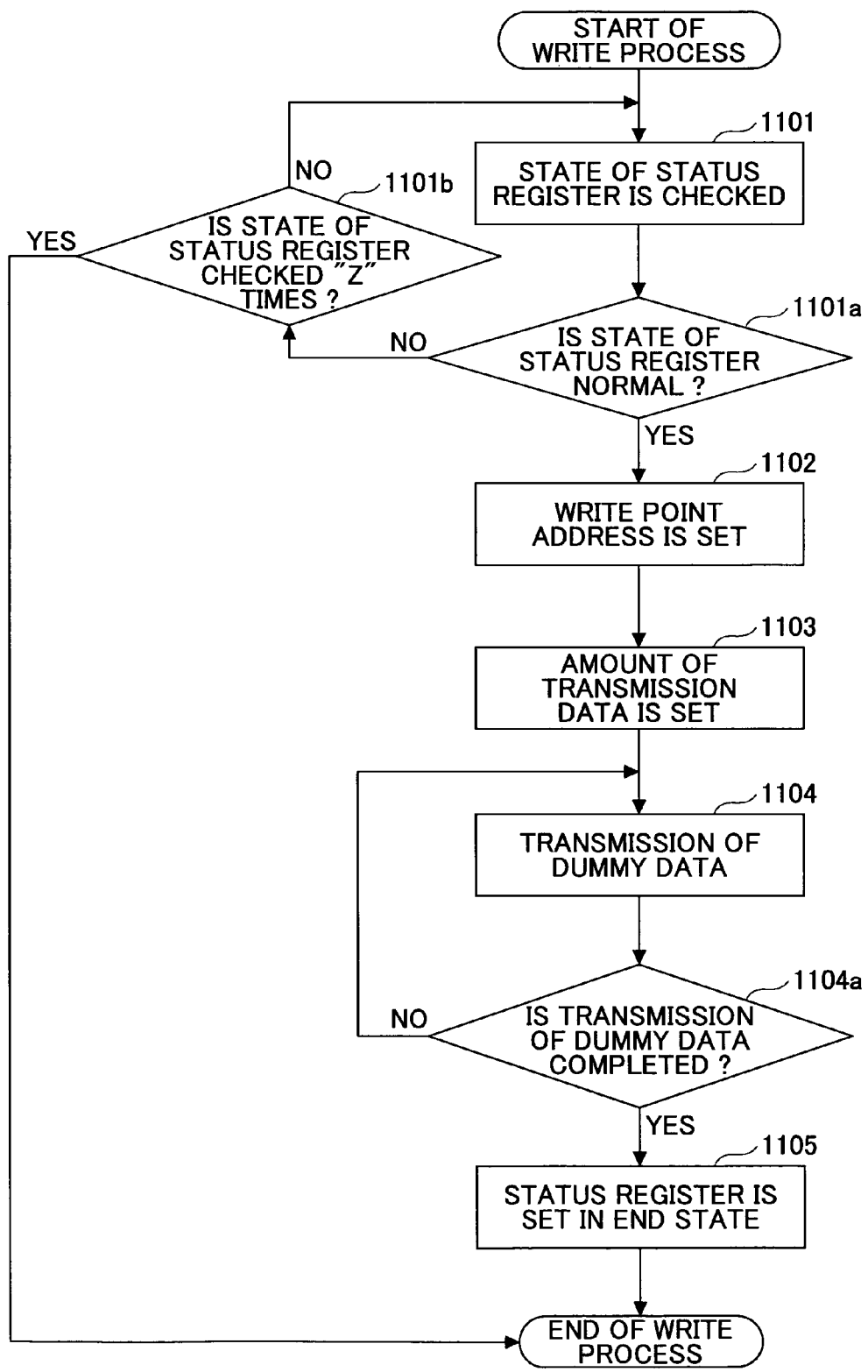
FIG. 11A is a flowchart for explaining the procedure in the write process (step 1003) of the middleware.
Figure 11B:
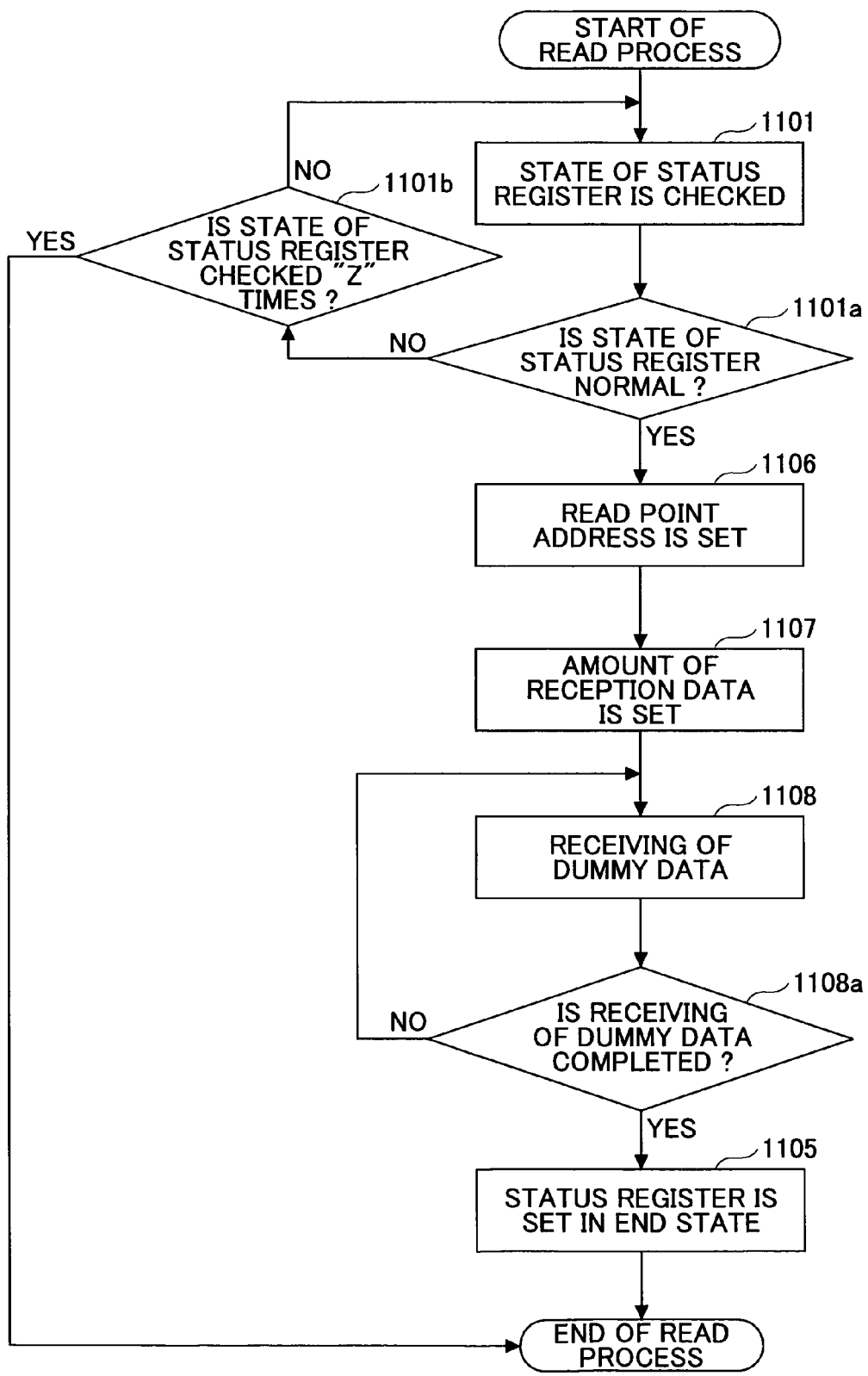
FIG. 11B is a flowchart for explaining the procedure in the read process (step 1004) of the middleware.

FIG. 11A is a flowchart for explaining the procedure in the write process (step 1003) to the middleware, and FIG. 11B is a flowchart for explaining the procedure in the read process (step 1004) from the middleware.

The middleware 108 which performs the bill recognition process and the middleware 111 which performs the illegal copy detection process use the same device. The procedures performed by the image processor control unit 502 in the write process (step 1003) and in the read process (step 1004) are the same.

The write process (step 1003) uses the above-mentioned addresses A and B. In the status register checking (step 1101), it is determined whether the state of the middleware is indicated by the normal value, by making reference to the value of the address B.

When the state of the middleware is not indicated by the normal value (error) for some reason, the checking is performed repeatedly until the indication of the normal value is obtained (steps 1101a, 1101b). When the state of the middleware is not indicated by the normal value after the checking is performed Z times (or the maximum number of times of checking), the write process is ended abnormally.

At the time of the abnormal end, the state is stored as NG (no good) at the result storing step 1006.

When the normal value of the status register can be detected, the control progresses to the next step 1102. The write point address is set to the read/write register (step 1102). The read/write register is assigned to the address A according to the sequence of the processing flow. The amount of transmission data is set to the read/write register (step 1103). The dummy data (one indicating the value of some words, for example, 0x1234), which is the data to be transmitted, is written to the middleware by the amount of transmission data set the step 1103 (step 1104, 1104a).

After the writing of all the data to the address A is completed, the status register end setting is performed to set the status register at the address B in the end state (step 1105). Then, the write process (step 1003) is terminated.

The read process (step 1004) of FIG. 11B is essentially the same as the write process (step 1003) of FIG. 11A described above, and a description of the read process (step 1004) will be omitted.

Figure 12:
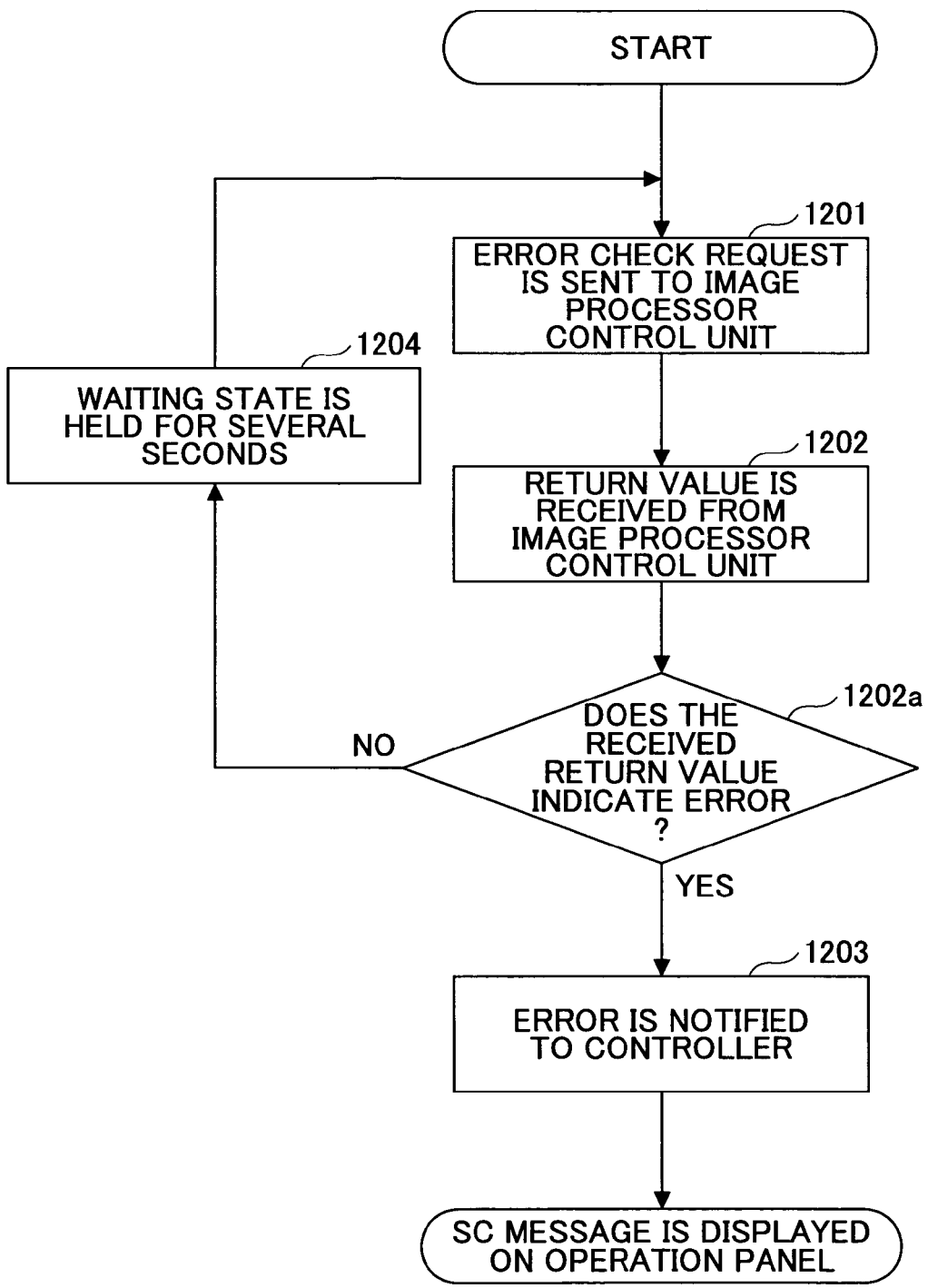
FIG. 12 is a flowchart for explaining the control procedure in the device error check of the host control device.

FIG. 12 is a flowchart for explaining the control procedure in the device error check of the host control device 501. This procedure is started after power-up of the MFP. As shown in FIG. 12, an error check request is sent to the image processor control unit 502 at constant timing (step 1201), and the return value is received from the image processor control unit 502 (step 1202) so that the device error determination is carried out.

In step 1202a, it is determined whether the device is in the error state. When it is not in the error state, the device error checking and the operation of the other software are continuously processed.

In the device error checking, after the power-up of the MFP occurs, the wait processing for several seconds is always performed (step 1204), the above operation is repeated in which the error check request is sent to the image processor control unit 502 at constant intervals (step 1201) and the device error check result is received from the image processor control unit 502 (step 1202).

When the returned result value indicates the error state of the image processor control unit 502, the error is notified to the controller 201 (step 1203), so that the SC (serviceman call) message is displayed on the operation screen 1301a of the operation panel 1301 as shown in FIG. 13. In this condition, all the functions of the MFP are stopped, and the input of the start button or a scan request and a printer request sent from a client PC connected to the network are not accepted. This state is held until the MFP is set in the state where operation of the middleware 108 for the bill recognition process or the middleware 111 for the illegal copy detection process is guaranteed.

FIG. 13 shows a display message of an operation screen 1301a of the operation panel 1301. FIG. 14 shows an example of the image-processing parameter used in this embodiment.

In the example of FIG. 14, the index numbers of P (program number) and D (data number) which are index numbers are determined from the request level 1, the scaling factor, and the request level 2. The request level means the kind of the application or the quality-of-image mode which are specified by the user in the operation screen of the operation panel 1301.

FIG. 15 shows an example of the parameter set in the middleware 108, the middleware 110 and the middleware 111. The parameter set in the middleware 108, the middleware 110 and the middleware 111 is essentially the same as that of the hardware 109, but it deals with the image processing program itself.

The parameter set in the middleware 108, the middleware 110 and the middleware 111 includes the program and data. The program codes are actually downloaded to the middleware 108, the middleware 110, and the middleware 111, and the image processing is carried out in accordance with the downloaded program codes. The data is accessed by the program downloaded to each middleware, and the data indicates the value needed to perform the image processing. The data includes the threshold processing data, the gamma process data, etc. The program and the data constitute the numerical value of the element of the table or the array element (in the const area) of the table. The writing is performed on the basis of 8 bits or 16 bits. It is defined the program represents the image processing which is operated in the middleware, and the data value represents the value used as the parameter which is accessed by the image processing operated in the middleware.

FIG. 16 shows an example of the parameter set in the hardware 109. According to the content assigned to each bit, the table element (=image-processing parameter) is set up to the registers existing in the hardware 109 by using the table (const area) having the same amount of data.

A simplified example of the actually used parameter is illustrated in FIG. 16, and the parameter set in the hardware 109 indicates the number for the element on the basis of 8 bits or 16 bits which is managed on the table called the data. The variations of FIG. 15 and FIG. 16 correspond to the index numbers of P (program number), D (data number) of FIG. 14. When the object of setting is the middleware, the setting value stored in the ROM by the P number and the D number according to the index number which is selected by the portion which computes the image-processing parameter is set to the middleware. The program constitutes an array of hexadecimal data.

When the object of the setting is the hardware 109, the setting value stored in the ROM by the D number is set to the hardware 109.

Thus, the ROM (in the const area) containing the program and data value of the middleware 108 or 111 is managed as the software, and when the newest program of bill recognition process or illegal copy detection process is released, it can be easily loaded by the software replacement.

Figure 17:
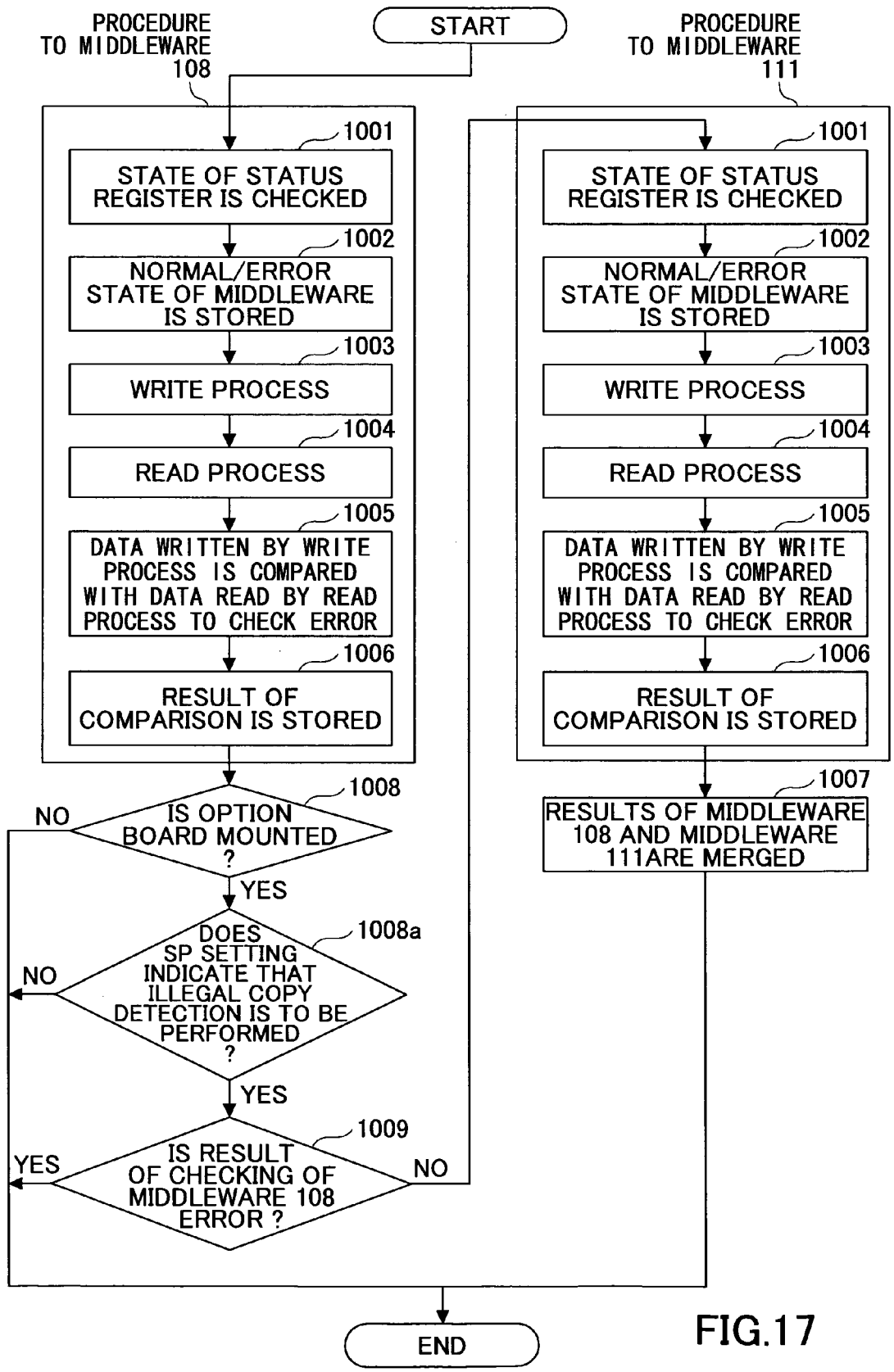
FIG. 17 is a flowchart for explaining the procedure in which the device error checking of the middleware which performs the illegal copy detection process is omitted when the setting is chosen as not performing the illegal copy detection process.

FIG. 17 is a flowchart for explaining the procedure in which the device error checking of the middleware 111 which performs the illegal copy detection process is omitted when the setting is chosen from the operation panel 1301 as not performing the illegal copy detection process.

The timing control of the sending of an error check request from the host control unit 501 to the image processor control unit 502, the operation of the host control unit 501 after the error determination, the displaying in the operation screen of the controller 201, etc. are essentially the same as those of the procedure of FIG. 10. The processing of accessing of the user setting SP specified by the user, and of determining whether the device error check is performed for the middleware 111 for illegal copy detection process or not, based on the setting SP, are added to the procedure by the image processing controller 502.

After the procedure of FIG. 17 is performed additionally, if the setting of the MFP having the option board 105 (containing the middleware 111) mounted is changed by the user or the system manager on the operation panel so as to omit the device error checking of the middleware 111, the setting of the MFP can be arranged such that the illegal copy detection process of the middleware 111 is not performed.

According to this embodiment, it is possible to easily improve the conventional ASIC replacement measures into the DSP replacement measures.

In the state where the power of the image forming device is turned on, the error check of the image-processing module is always performed on real time irrespective of the state before image formation, the state during image formation, and the state after image formation. When the error is detected, all the functions of the image forming device are stopped, and it is possible to prevent the erroneous recognition of a bill copy and an illegal copy from arising.

As mentioned above, according to the image processing device of this embodiment, the following advantageous features can be obtained.

1) The detection as to whether the recognition process functions correctly can be performed strictly, and incorrect determination of the recognition process due to a problem of the image processing device itself can be prevented by performing the error detection on real time.

2) When the detachably attached second image data processing device which performs the recognition process, such as the illegal copy detection process or the bill recognition process, is detached, it is possible to stop all the functions immediately.

3) The detection as to whether the illegal copy detection process functions correctly can be performed strictly, and incorrect determination of the illegal copy detection process due to a problem of the image processing device itself can be prevented by performing the error detection on real time.

4) The detection as to whether the bill recognition process functions correctly can be performed strictly, and incorrect determination of the bill recognition process due to a problem of the image processing device itself can be prevented by performing the error detection on real time.

5) The latest version of image processing for the illegal copy detection process and the bill recognition process which are included in the recognition processes can be provided by exchanging the program which operates in the middleware.

6) The specialized type of image processing for the bill recognition process which is appropriate for the country of concern can be provided by exchanging the program which operates in the middleware.

7) The detection as to whether the recognition process functions correctly can be performed on real time, and incorrect determination of the recognition process due to a problem of the image processing device itself can be prevented.

8) Incorrect determination of the recognition process due to a problem of the image processing device itself can be prevented.

9) When it is specified that the recognition process installed on the option board is not to be performed, it is possible to avoid stopping operation due to the error detection although an image processing can be performed.

10) Because the detection as to whether the second image data processing device that performs the recognition process operates normally is not performed, the processing time can be shortened.

The present invention is not limited to the specifically disclosed embodiments, and variations and modifications may be made without departing from the scope of the present invention.

The present application is based on Japanese patent application No. 2007-238242, filed on Sep. 13, 2007, the contents of which are incorporated herein by reference in their entirety.

The invention claimed is:

1. An image processing device comprising:
a storage unit storing image data input from a reading unit when reading a document by the reading unit;
a first image-data-processing unit having a function of performing a bill recognition process for the image data and processing the image data stored in the storage unit by performing the bill recognition process;
a second image-data-processing unit detachably attached to the first image-data-processing unit, having a function of performing an illegal copy detection process, and processing the image data, stored in the storage unit by performing the illegal copy detection process; and
a control unit configured to determine whether processing results of the first and second image-data-processing units are in a normal state at a predetermined interval,
wherein, when at least one of the processing results of the first and second image-data-processing units is in an error state, the control unit stops all functions of the image processing device until both the processing results are checked as being in a normal state.

2. The image processing device according to claim 1, wherein the control unit checks values of a state register indicating states of the first and second image-data-processing units, respectively, to determine whether the processing results of the first and second image-data-processing units are in a normal state.

3. The image processing device according to claim 1, wherein the control unit checks values of results of writing and reading processes to a specific address of each of the first and second image-data-processing units, respectively, to determine whether the processing results of the first and second image-data-processing units are in a normal state.

4. The image processing device according to claim 1, wherein each of the first and second image-data-processing units includes a middleware.

5. The image processing device according to claim 1, wherein the determination as to whether the processing results of the first and second image-data-processing units are in a normal state is made at the predetermined interval for each of a state before image formation, a state during image formation, and a state after image formation.

6. The image processing device according to claim 1, wherein the determination as to whether the processing result of the second image-data-processing unit is in a normal state is made by checking a value of a register indicating a state of the second image data processing unit.

7. The image processing device according to claim 1, wherein the determination as to whether the processing result of the second image-data-processing unit is in a normal state is made by checking of writing and reading processes to a specific address of the second image data processing unit.

8. The image processing device according to claim 1, wherein when selection of not using the illegal copy detection function is input, the control unit does not determine whether operation of the second image-data-processing unit is normal, in accordance with the selection.

9. The image processing device according to claim 8, wherein the selection of not using the illegal copy detection function is input by a user from an operation panel.

10. An image forming device in which the image processing device of claim 1 is arranged.

11. An image processing method for use in an image processing device including a storage unit which stores image data input from a reading unit when reading a document by the reading unit; a first image-data-processing unit which performs a bill recognition process for the image data and processes the image data stored in the storage unit by performing the bill recognition process; a second image-data-processing unit which is detachably attached to the first image-data-processing unit, has a function of performing an illegal copy detection process, and processes the image data stored in the storage unit by performing the illegal copy detection process; and a control unit which determines whether processing results of the first and second image-data-processing units are in a normal state at a predetermined interval, the image processing method comprising steps of:
recognizing the input image data;
performing image processing based on a result of the recognition in the recognizing step; and
determining whether operation of the first and second image-data-processing units are normal by checking values of registers indicating a state of the first and second image-data-processing units,
wherein, when at least one of the registers indicates an error of at least one of the first and second image-data-processing units, all functions of the image processing device are stopped immediately.

12. The image processing method according to claim 11, wherein the recognizing step includes an illegal copy detection function.

13. The image processing method according to claim 11, wherein the control unit checks values of results of writing and reading processes to a specific address of each of the first and second image-data-processing units, respectively, to determine whether the processing results of the first and second image-data-processing units are in a normal state.

14. The image processing method according to claim 11, wherein the determination as to whether the processing results of the first and second image-data-processing units are in a normal state is made at the predetermined interval for each of a state before image formation, a state during image formation, and a state after image formation.

15. The image processing method according to claim 11, wherein the determination as to whether the processing result of the second image-data-processing unit is in a normal state is made by checking of writing and reading processes to a specific address of the second image data processing unit.

16. The image processing method according to claim 11, wherein, when selection of not using the illegal copy detection function of the second image-data-processing unit is input, the determination as to whether operation of the second image-data-processing unit is normal is not performed in accordance with the selection.

17. The image processing method according to claim 16, wherein the selection of not using the illegal copy detection function is input by a user from an operation panel.

* * * * *